(12) United States Patent
Takemura et al.

(10) Patent No.: US 11,050,237 B2
(45) Date of Patent: Jun. 29, 2021

(54) CIRCUIT BREAKER FAILURE PROTECTION RELAY AND PROTECTION RELAY SYSTEM

(71) Applicant: MITSUBISHI ELECTRIC CORPORATION, Tokyo (JP)

(72) Inventors: Satoshi Takemura, Tokyo (JP); Shigetoo Oda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 268 days.

(21) Appl. No.: 16/093,987

(22) PCT Filed: Apr. 22, 2016

(86) PCT No.: PCT/JP2016/062703
§ 371 (c)(1),
(2) Date: Oct. 16, 2018

(87) PCT Pub. No.: WO2017/183171
PCT Pub. Date: Oct. 26, 2017

(65) Prior Publication Data
US 2019/0109451 A1  Apr. 11, 2019

(51) Int. Cl.
*H02H 3/08* (2006.01)
*H02H 3/04* (2006.01)
(Continued)

(52) U.S. Cl.
CPC .......... *H02H 3/083* (2013.01); *H02H 1/0007* (2013.01); *H02H 3/044* (2013.01);
(Continued)

(58) Field of Classification Search
CPC ................ G01R 31/327; G01R 31/333; G01R 31/3275; G01R 31/3277; G01R 31/3278;
(Continued)

(56) References Cited

U.S. PATENT DOCUMENTS 4,858,058 A * 8/1989 Ishii ................. H02H 1/046
361/96
5,309,312 A * 5/1994 Wilkerson ........... H02H 3/0935
361/79
(Continued)

FOREIGN PATENT DOCUMENTS

JP      05022850 A    1/1993
KR  20130035295 A    4/2013

OTHER PUBLICATIONS

International Search Report (with English Translation) and Written Opinion issued in International Patent Application No. PCT/JP2016/062703, 7 pages (dated Jun. 28, 2016).
(Continued)

*Primary Examiner* — Gustavo A Rosario-Benitez
(74) *Attorney, Agent, or Firm* — Buchanan Ingersoll & Rooney PC

(57) ABSTRACT

A circuit breaker failure protection relay includes an input circuit to which an opening command from a first circuit breaker is input, and a circuit breaker failure detection element configured to compare a magnitude of a current detection signal in a power system with a setting value to make a determination about an overcurrent. The circuit breaker failure detection element is capable of changing the setting value to a first value and a second value that is larger than the first value according to a switching signal. The circuit breaker failure protection relay is configured to, when the opening command is input and when the circuit breaker failure detection element determines that an overcurrent occurs, output an opening command for the second circuit breaker in a neighborhood of the first circuit breaker.

14 Claims, 15 Drawing Sheets

(51) Int. Cl.
*H02H 3/05* (2006.01)
*H02H 1/00* (2006.01)
*H02H 3/00* (2006.01)

(52) U.S. Cl.
CPC ............... *H02H 3/05* (2013.01); *H02H 3/08* (2013.01); *H02H 3/006* (2013.01)

(58) Field of Classification Search
CPC ............ H02H 3/28; H02H 3/033; H02H 3/08; H02H 9/08; H02H 11/006; H02H 3/044
See application file for complete search history.

(56) References Cited

U.S. PATENT DOCUMENTS

| | | | | |
|---|---|---|---|---|
| 5,822,165 | A * | 10/1998 | Moran | H02H 3/07 361/78 |
| 5,892,645 | A * | 4/1999 | Watanabe | H02H 7/28 361/85 |
| 6,452,769 | B1 * | 9/2002 | Sohde | H02J 3/00 361/62 |
| 2003/0039086 | A1 * | 2/2003 | Kase | H02H 3/081 361/65 |
| 2003/0151867 | A1 * | 8/2003 | Kase | H02H 3/081 361/77 |
| 2009/0021874 | A1 * | 1/2009 | Divito | H02H 3/023 361/57 |
| 2011/0128005 | A1 * | 6/2011 | Weiher | H02H 3/044 324/424 |
| 2011/0141643 | A1 * | 6/2011 | Hummel | H02H 3/08 361/93.1 |
| 2012/0099233 | A1 * | 4/2012 | Thorburn | H02H 3/006 361/78 |
| 2015/0326004 | A1 * | 11/2015 | Curtis | H02H 1/06 361/47 |
| 2016/0172838 | A1 * | 6/2016 | Luebke | H02H 3/006 361/93.1 |
| 2016/0203932 | A1 * | 7/2016 | Niehoff | H01H 47/32 361/170 |

OTHER PUBLICATIONS

Notification of Reason for Refusal dated Mar. 2, 2020, issued in corresponding Korean Patent Application No. 10-2018-7026136, 8 pages including 4 pages of English translation.

* cited by examiner

CIRCUIT BREAKER FAILURE PROTECTION RELAY AND PROTECTION RELAY SYSTEM

TECHNICAL FIELD

The present disclosure relates to a circuit breaker failure protection relay, and also to a protection relay system including the circuit breaker failure protection relay.

BACKGROUND ART

There may be a possibility that, even when a protection relay outputs an opening signal to a circuit breaker upon occurrence of a system fault, the circuit breaker cannot properly carry out its function due to the failure in the circuit breaker. Occurrence of such a circuit breaker failure (CBF) may: cause damage to devices by a fault current; increase the range of the fault; expand the range of power failure; deteriorate the system stability; propagate the influence of the fault to the entire power system; and the like.

Thus, in order to immediately remove the fault, a CBF relay (circuit breaker failure protection relay) is provided, which is configured to, upon detection of a CBF, output an opening command (trip signal) to an adjacent circuit breaker. Generally, the CBF relay includes an overcurrent (OC) relay element for detecting that a fault current is not broken by a circuit breaker failure. The CBF relay is configured to output a trip signal for opening an adjacent circuit breaker when it receives a trip signal from a main protection relay device and detects an overcurrent by the overcurrent relay element (for example, see Japanese Patent Laying-Open No. H5-22850 (PTD 1)).

CITATION LIST

Patent Document

PTD 1: Japanese Patent Laying-Open No. H5-22850

SUMMARY OF INVENTION

Technical Problem

The magnitude of the fault current in the power system is usually larger in value than the magnitude of the load current at the time when the power system is in the normal state, but may be smaller in value than the magnitude of the load current in a certain state. For example, when a sneak current occurring during a ground fault flows as a fault current, when the current from a lower-voltage power supply remains without being broken in the state where a power supply is connected to each of both ends of a transmission line, when a large resistance occurs at a fault point in the case of a ground fault, or the like, a fault current smaller than the load current flows.

In order for the CBF relay to reliably detect a circuit breaker failure, the setting value of the overcurrent relay element needs to be set such that a fault current smaller than the load current as described above also can be detected by the overcurrent relay element. However, in this case, the load current in the normal state is also to be detected by the overcurrent relay element in the CBF relay. Thus, when the CBF relay erroneously detects a trip signal from the main protection relay device, the CBF relay is to malfunction. As will be described later in detail, when the trip line is erroneously grounded during an inspection, the trip signal may be erroneously detected.

When the CBF relay malfunctions, the neighboring circuit breakers are caused to operate, thereby increasing the range of the power failure section that is disconnected from the power system. Furthermore, the CBF relay does not output a reclosing command after the trip command is output. This causes a problem that the time period of a power failure is lengthened also when a flashover occurs due to a thunderbolt, contact with a flying object, or the like. Accordingly, malfunctioning of the CBF relay should be avoided as much as possible.

In order to solve the problem of malfunctioning of the CBF relay as described above, it is conceivable that the setting value of the overcurrent relay element in the CBF relay is set at a value large enough to prevent detection of a load current. However, this prevents detection of a fault current that is smaller than the load current as described above. Thereby, the countermeasures against the circuit breaker failure cannot be completely taken.

The present disclosure has been made in light of the above-described problems. A main object of the present disclosure is to provide a circuit breaker failure protection relay configured to reliably detect a circuit breaker failure and configured not to malfunction even when a trip signal from a protection relay device is erroneously detected.

Solution to Problem

A circuit breaker failure protection relay of the present disclosure includes: an input circuit to which an opening command for a first circuit breaker is input; and a circuit breaker failure detection element configured to compare a magnitude of a current detection signal in a power system with a setting value to make a determination about an overcurrent. The circuit breaker failure detection element is capable of changing the setting value to a first value and a second value that is larger than the first value according to a switching signal. The circuit breaker failure protection relay is configured to, when the opening command is input and when the circuit breaker failure detection element determines that an overcurrent occurs, output an opening command for a second circuit breaker in a neighborhood of the first circuit breaker.

Advantageous Effects of Invention

According to the present invention, malfunctioning of the circuit breaker failure protection relay can be prevented by setting the setting value at the second value during the inspection and the like of the protection relay system. Also, a circuit breaker failure can be reliably detected by setting the setting value at the first value during the normal operation of the protection relay system.

DESCRIPTION OF EMBODIMENTS

Figure 1:
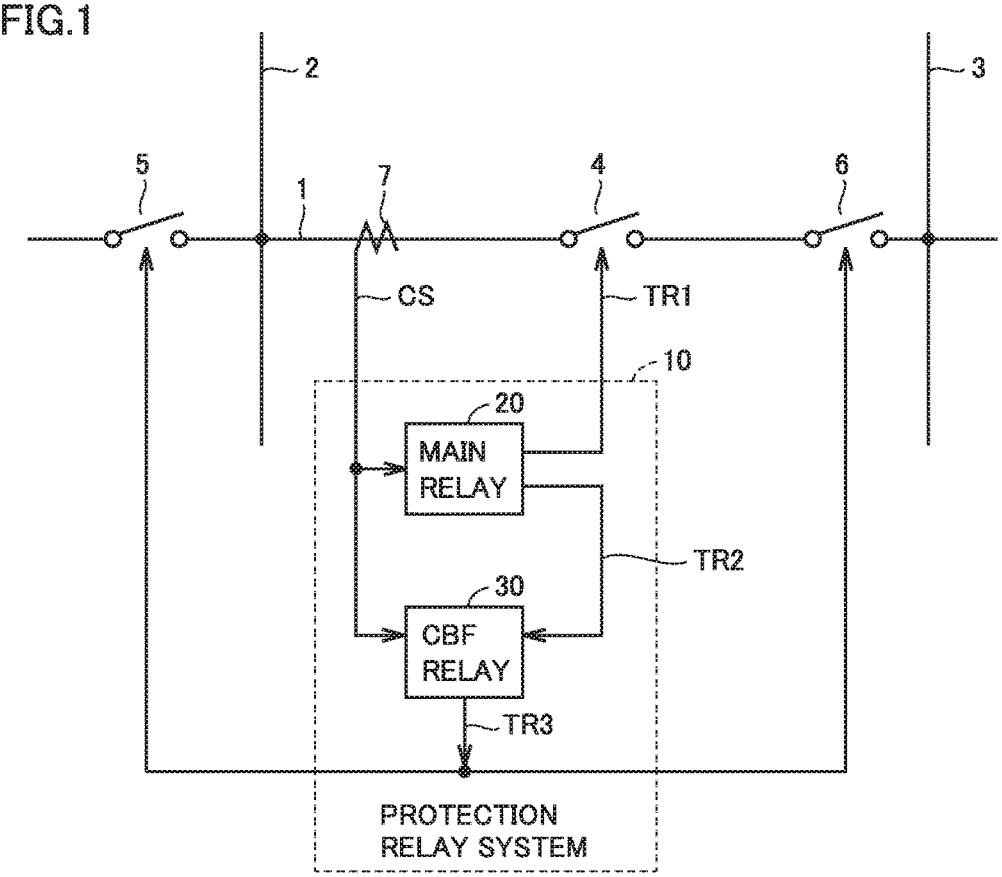
FIG. 1 is a diagram schematically showing the entire configuration of a power system in which a protection relay system is placed.

Each embodiment will be hereinafter described in detail with reference to the accompanying drawings, in which the same or corresponding components are designated by the same reference characters, and description thereof may not be repeated.

First Embodiment

[Configuration of Power System]

FIG. 1 is a diagram schematically showing the entire configuration of a power system in which a protection relay system is placed. In the power system shown in FIG. 1, an electric line 1 is connected to bus lines 2 and 3. Furthermore, circuit breakers 4, 5 and 6, and a current transformer 7 are provided on electric line 1. When the power system in FIG. 1 is intended for a three-phase alternating current, circuit breakers 4, 5 and 6, and current transformer 7 are provided on the electric lines of corresponding phases.

A protection relay system 10 includes a protection relay device 20 for detecting a fault in the power system and a circuit breaker failure protection relay device 30. In the present specification, for the sake of simplicity, protection relay device 20 may also be referred to as a main relay 20, and circuit breaker failure protection relay device 30 may also be referred to as a CBF relay 30.

Generally, main relay 20 and CBF relay 30 are housed in a common cabinet. This cabinet is provided with a front door and a back door. When the front door is opened, the operation panel of main relay 20 and the operation panel of CBF relay 30 can be manipulated. When the back door is opened, inspection of each of wiring lines connected to main relay 20 and the CBF relay can be done, or connection of each of the wiring lines can be done.

Based on a current detection signal CS from current transformer 7 provided on electric line 1, main relay 20 detects occurrence of a fault in the power system. Upon detection of the fault, main relay 20 outputs a trip signal TR1 (an opening command) to circuit breaker 4 and outputs a trip signal TR2 (an opening command) to CBF relay 30 (the trip signal (opening command) output from a common digital output circuit may be branched, and the branched signals may be input into circuit breaker 4 and CBF relay 30). The fault determination scheme employed by main relay 20 is not particularly limited. Main relay 20 may include a current differential relay element, or may include a distance relay element, for example. In the case of a current differential relay element, the current detection signal from another current transformer (not shown) provided on electric line 1 is also input into main relay 20. In the case of a distance relay element, the voltage detection signal from a voltage transformer (not shown) provided on bus line 2 is also input into main relay 20.

CBF relay 30 includes a CBF detection element (for example, designated by a reference character 40A in FIG. 4) for determining based on current detection signal CS from current transformer 7 whether a fault current occurs or not. When the fault current is detected even when the time period required to open circuit breaker 4 has elapsed after CBF relay 30 receives trip signal TR2 from main relay 20, CBF relay 30 determines that a failure occurs in circuit breaker 4, and then outputs a trip signal TR3 for breaking each of neighboring circuit breakers 5 and 6. Trip signal TR3 is branched and input into circuit breakers 5 and 6 (each of the trip signals output from different digital output circuits may be input into a corresponding one of circuit breakers 5 and 6).

Figure 2:
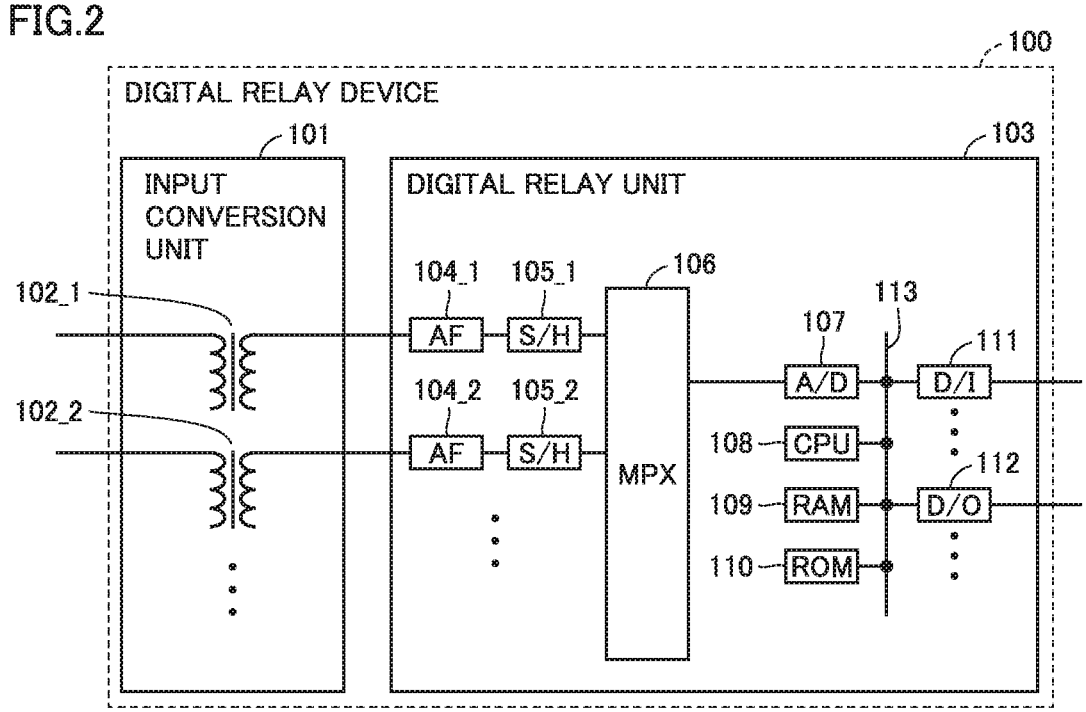
FIG. 2 is a block diagram showing the hardware configuration of a digital protection relay device constituting each of a main relay and a CBF relay in FIG. 1.

Main relay 20 and CBF relay 30 described above each are constituted by a digital protection relay device shown in FIG. 2.

[Hardware Configuration of Digital Protection Relay Device]

FIG. 2 is a block diagram showing the hardware configuration of a digital protection relay device constituting each of the main relay and the CBF relay in FIG. 1. Referring to FIG. 2, a digital relay device 100 (20 and 30 in FIG. 1) includes an input conversion unit 101 having auxiliary transformers 102_1, 102_2, . . . , incorporated therein, and a digital relay unit 103.

Input conversion unit 101 serves as an input unit configured to receive a current signal of the three-phase AC current acquired for each phase in current transformer 7 in FIG. 1. Each auxiliary transformer 102 converts the current signal from current transformer 7 into a voltage signal of a voltage level that is suitable for signal processing in digital relay unit 103.

Digital relay unit 103 includes: analog filters (AF) 104_1, 104_2, . . . ; sample- and-hold circuits (S/F) 105_1, 105_2, . . . ; a multiplexer (MPX) 106; and an analog-to-digital (A/D) converter 107. Digital relay unit 103 further includes: a central processing unit (CPU) 108; a random access memory (RAM) 109; a read only memory (ROM) 110; a plurality of digital input (D/I) circuits 111; a plurality of digital output (D/O) circuits 112; and a bus 113 that connects these components.

Each analog filter 104 is provided as a low pass filter, for example, for removing the aliasing error during A/D conversion. Each sample-and-hold circuit 105 samples the signal having passed through a corresponding one of analog filters 104 at a prescribed sampling frequency, and then holds the sampled signal. Multiplexer 106 sequentially selects the voltage signals held by sample-and-hold circuits 105_1, 105_2, . . . . A/D converter 107 converts the voltage signal selected by the multiplexer into a digital value. CPU 108 operates according to the programs stored in ROM 110 and an external storage device (not shown), and performs the operation and the like for various types of protection elements based on the digital data output from A/D converter 107. D/O circuit 112 outputs a trip signal (opening command) for opening the circuit breaker. Trip signal TR2 output from D/O circuit 112 in main relay 20 is input into D/I circuit 111 in CBF relay 30 in FIG. 1.

[Erroneous Detection of Trip Signal]

Figure 3:
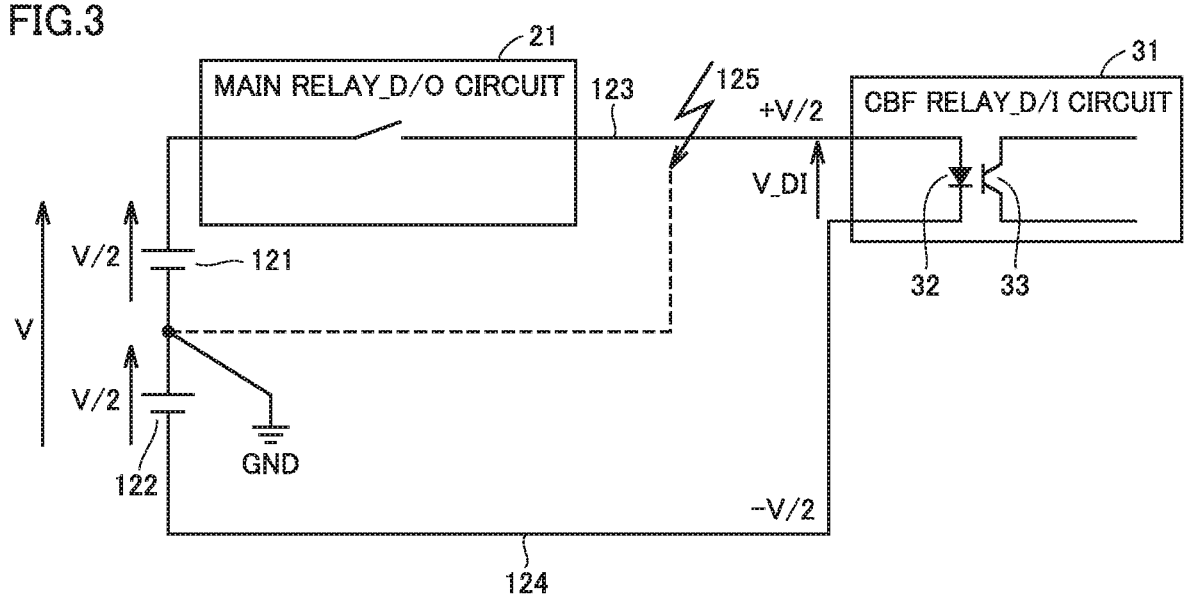
FIG. 3 is a diagram for illustrating the cause of erroneous detection of a trip signal.

FIG. 3 is a diagram for illustrating the cause of erroneous detection of a trip signal. FIG. 3 shows a D/O circuit 21 and a D/I circuit 31 in main relay 20 and CBF relay 30, respectively, in FIG. 1, and DC power supplies 121 and 122 for driving main relay 20 and CBF relay 30.

In an electric power substation, storage batteries are used as DC power supplies 121 and 122. Generally, the intermediate point between DC power supplies 121 and 122 is grounded in order to lower a potential to ground in consideration of an electric shock or the like. Thus, D/O circuit 21 in main relay 20 and D/I circuit 31 in CBF relay 30 are connected by a signal line 123 to which a power supply voltage (+V/2) is applied from DC power supply 121 and a signal line 124 to which a power supply voltage (−V/2) is applied from DC power supply 122.

D/I circuit 31 in CBF relay 30 detects an input voltage V_DI by a photo coupler (a photodiode 32 and a photo transistor 33), for example. CBF relay 30 determines whether the logic level of input voltage V_DI is "1" (in the active state) or "0" (in the inactive state). In the present specification, the active state is associated with "1" while the inactive state is associated with "0". Also, each logical operation is assumed to be a positive logic. However, it is not always necessary to apply the relation of association as described above.

In the case where the signal line connecting main relay 20 and CBF relay 30 is sound, when main relay 20 outputs a trip signal (that is, when the switch of D/O circuit 21 in main relay 20 is brought into an ON state), a voltage V occurs across the input terminals of D/I circuit 31 in CBF relay 30, and then, CBF relay 30 detects "1" as a trip signal input.

On the other hand, it is assumed that a ground fault occurs at a fault point 125 on signal line 123 on the high voltage (+V/2) side, which connects main relay 20 and CBF relay 30. For example, it is assumed that signal line 123 is erroneously grounded during an inspection. In this case, the voltage on signal line 123 on the high voltage side is 0V while the voltage on signal line 124 on the low voltage side is −V/2, so that a voltage of +V/2 is generated across the input terminals of D/I circuit 31 in CBF relay 30. Consequently, depending on the threshold value of the detection voltage in the D/I circuit (when the threshold value of the detection voltage is equal to or less than V/2), CBF relay 30 erroneously detects that "1" has been input as a trip signal input.

In this case, it is assumed that the CBF detection element in CBF relay 30 in FIG. 1 is formed only of an overcurrent determination element, and that its setting value is set at a value that allows detection of the fault current smaller than the load current at the time when the power system is sound. This causes the overcurrent determination element to determine that an overcurrent occurs also at the time when the power system is sound. Then, when CBF relay 30 erroneously detects a trip signal by the above-described mechanism in this state, CBF relay 30 is caused to malfunction so as to erroneously output a trip signal to neighboring circuit breakers. As will be described below, CBF relay 30 in the present embodiment is designed not to malfunction also in such a case.

[Configuration and Operation of CBF Relay]

Figure 4:
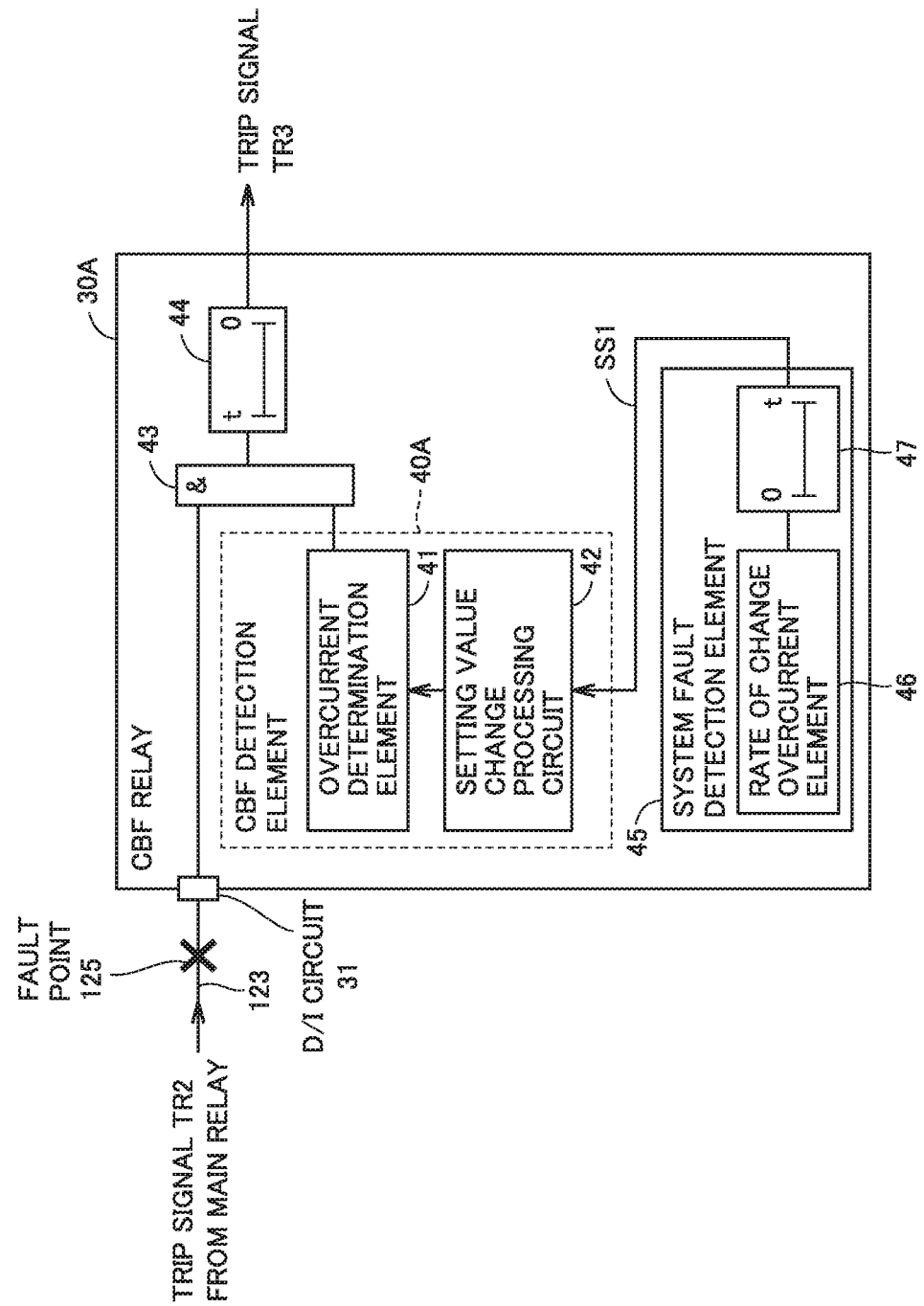
FIG. 4 is a block diagram showing the functional configuration of a CBF relay in the first embodiment.

FIG. 4 is a block diagram showing the functional configuration of a CBF relay in the first embodiment. A CBF relay 30A in FIG. 4 corresponds to CBF relay 30 in FIG. 1. Also, each of CBF relays 30B to 30H in other subsequent embodiments also corresponds to CBF relay 30 in FIG. 1.

Referring to FIG. 4, CBF relay 30A includes a D/I circuit 31 configured to receive trip signal TR2 from main relay 20, a CBF detection element 40A, a system fault detection element 45, an AND gate 43, and an on-delay timer 44. The on-delay timer serves as a timer configured to provide an output after a lapse of a setting time t. Each of the elements other than the above-described D/I circuit 31 is implemented by CPU 108 in FIG. 2 executing a program. It goes without saying that the above-described elements in CBF relay 30 can be implemented also by using dedicated circuits in place of CPU 108.

CBF detection element 40A compares the setting value and the magnitude of current detection signal CS from current transformer 7 in FIG. 1, and detects a failure of circuit breaker 4 based on the comparison result. In this case, the setting value of CBF detection element 40A is characterized in that it can be changed in accordance with a switching signal SS1. Specifically, CBF detection element 40A includes an overcurrent determination element 41 and a setting value change processing circuit 42.

Overcurrent determination element 41 determines whether the magnitude of current detection signal CS from current transformer 7 in FIG. 1 exceeds the setting value or not. When current detection signal CS exceeds the setting value, overcurrent determination element 41 outputs the signal of a logic level "1" showing an overcurrent.

When switching signal SS1 from system fault detection element 45 is in the active state, setting value change processing circuit 42 sets the setting value of overcurrent determination element 41 at a value (a high-sensitive value) that allows detection of the fault current of the smallest conceivable magnitude (smaller than the magnitude of the load current at the time when the power system is in the normal state). In this case, the magnitude of the current means the amplitude or the effective value of the current. On the other hand, when switching signal SS1 is in the inactive state, setting value change processing circuit 42 sets the setting value of overcurrent determination element 41 at a value (a low-sensitive value) that allows detection of only the fault current larger than the load current. The low-sensitive setting value is larger than the high-sensitive setting value.

System fault detection element 45 detects a power system fault by the method different from the method employed in overcurrent determination element 41. Accordingly, system fault detection element 45 does not detect the load current in the normal state as a system fault. As specifically shown in FIG. 4, system fault detection element 45 includes a rate of change overcurrent element 46 and an off-delay timer 47.

Rate of change overcurrent element 46 determines, for example, whether the difference between the instantaneous value of the current at the present time and the instantaneous value of the current obtained one cycle before (or two cycles before, three cycles before, and the like) exceeds a prescribed threshold value or not. Alternatively, rate of change overcurrent element 46 determines whether the sum of the instantaneous value of the current at the present time and the instantaneous value of the current obtained 0.5 cycles before (or 1.5 cycles before, 2.5 cycles before, and the like) exceeds the prescribed threshold value or not. Accordingly, rate of change overcurrent element 46 can detect a sudden change of the amplitude or a sudden change of the phase in the power system. Also, a voltage variation width relay (voltage sudden change relay) or an undervoltage relay can also be used in place of rate of change overcurrent element 46.

Off-delay timer 47 serves as a timer configured such that its output becomes 0 after a lapse of setting time t. The setting time of off-delay timer 47 is set to be longer than the setting time of on-delay timer 44. The setting time of off-delay timer 47 needs to continue at least until trip signal TR3 is activated after a lapse of the setting time of on-delay timer 44.

When the logic level of trip signal TR2 from the main relay is "1" and when CBF detection element 40A detects a circuit breaker failure (that is, when the logic level of the output signal from overcurrent determination element 41 is "1"), AND gate 43 outputs trip signal TR3 through on-delay timer 44 to neighboring circuit breakers 5 and 6.

The on-delay timer serves as a timer configured to provide an output after a lapse of setting time t. Setting time t of on-delay timer 44 needs to be set at a time period that is obtained by adding the time period required for opening circuit breaker 4 and the time period required for returning the output from overcurrent determination element 41 back to "0". Generally, this setting time t is set at about 100 milliseconds to about 150 milliseconds.

Figure 5:
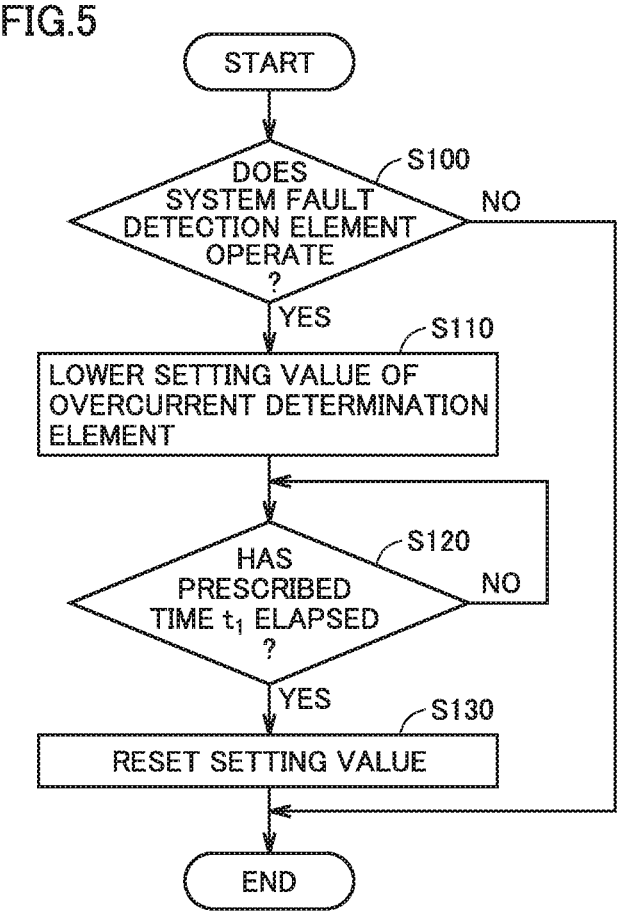
FIG. 5 is a flowchart illustrating the setting value changing procedure by a setting value change processing circuit in FIG. 4.

FIG. 5 is a flowchart illustrating the setting value changing procedure by the setting value change processing circuit in FIG. 4. Referring to FIGS. 4 and 5, when a system fault is detected by system fault detection element 45, that is, when switching signal SS1 is activated (YES in step S100), setting value change processing circuit 42 lowers the setting value of overcurrent determination element 41 (step S110). Then, after a lapse of a prescribed time t1 (YES in step S120), setting value change processing circuit 42 sets the setting value back to the original value (the low-sensitive value that allows detection of only the fault current larger than the load current) (step S130). Prescribed time t1 is set to be equal to or longer than the time period from when main relay 20 detects a system fault and outputs trip signal TR1 until when opening of circuit breaker 4 is completed thereby. For example, prescribed time t1 is set to be equal to or longer than 1 second.

[Effects]

As described above, according to CBF relay 30A in the first embodiment, only when a power system fault is detected by system fault detection element 45 (a rate of change overcurrent element), the setting value of overcurrent determination element 41 in the CBF relay is set at a value smaller than the load current. Accordingly, even when a trip signal is erroneously input, for example, by a short circuit of the input line of the trip signal in main relay 20 during an inspection, malfunctioning of CBF relay 30A can be prevented.

Second Embodiment

Figure 6:
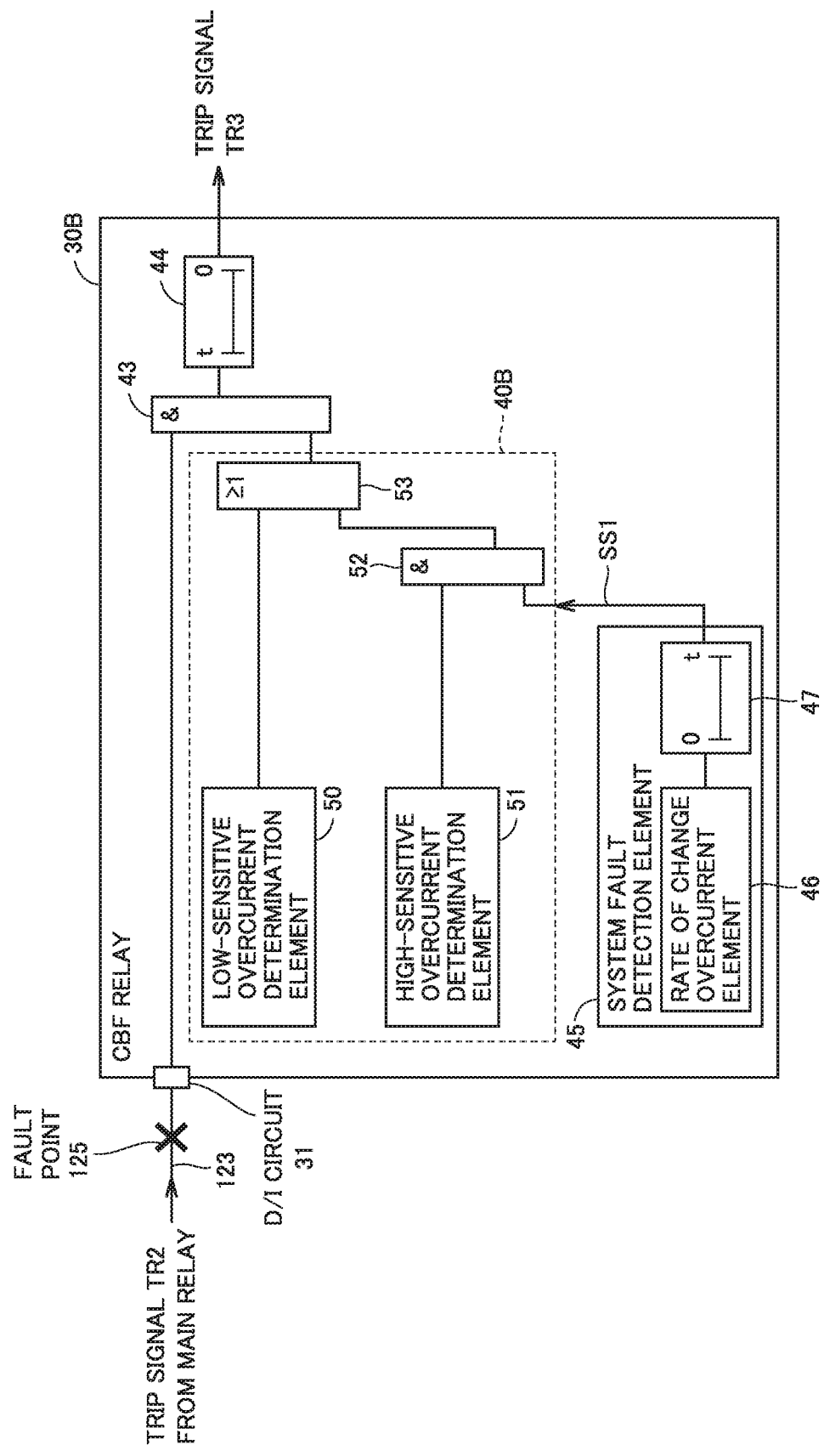
FIG. 6 is a block diagram showing the functional configuration of a CBF relay in the second embodiment.

FIG. 6 is a block diagram showing the functional configuration of a CBF relay in the second embodiment. A CBF relay 30B in FIG. 6 includes a CBF detection element 40B that is different in configuration from CBF detection element 40A in FIG. 4. Since other configurations of CBF relay 30B in FIG. 6 are similar to those of CBF relay 30A in FIG. 4, the same or corresponding components are designated by the same reference characters, and description thereof will not be repeated.

CBF detection element 40B in FIG. 6 compares the setting value and the magnitude of current detection signal CS from current transformer 7 in FIG. 1, and detects a failure of circuit breaker 4 based on the comparison result. In this case, CBF detection element 40B in FIG. 6 is different from CBF detection element 40A in FIG. 4 in that the setting value of CBF detection element 40B is changed by the logical operation carried out using switching signal SS1.

Specifically, as shown in FIG. 6, CBF detection element 40B includes a low-sensitive overcurrent determination element 50, a high-sensitive overcurrent determination element 51, an AND gate 52, and an OR gate 53. In low-sensitive overcurrent determination element 50, the setting value of the overcurrent determination element is set at a value that allows detection of only the fault current larger than the load current. In high-sensitive overcurrent determination element 51, the setting value of the overcurrent determination element is set at a value that allows detection of the fault current smaller than the load current (a value that allows detection of the fault current of the smallest conceivable magnitude).

When the logic level of the output signal from high-sensitive overcurrent determination element 51 is "1" and when the logic level of switching signal SS1 output from system fault detection element 45 is "1", AND gate 52 outputs the signal of a logic level "1". When the logic level of the output signal from AND gate 52 is "1" or when the logic level of the output signal from low-sensitive overcurrent determination element 50 is "1", OR gate 53 outputs the signal of a logic level "1" as an output signal from CBF detection element 40B.

Accordingly, CBF detection element 40B is configured to output the signal based on the determination result from high-sensitive overcurrent determination element 51 when a system fault is detected by system fault detection element 45, and also configured to output the signal based on the determination result from low-sensitive overcurrent determination element 50 when no system fault is detected by system fault detection element 45.

Also in the above-described configuration, as in the first embodiment, the setting values of overcurrent determination elements 50 and 51 in CBF detection element 40B can be dynamically switched depending on whether a system fault has occurred or not. As a result, even when the trip signal is erroneously input into CBF relay 30B, malfunctioning of CBF relay 30B can be prevented.

Figure 7:
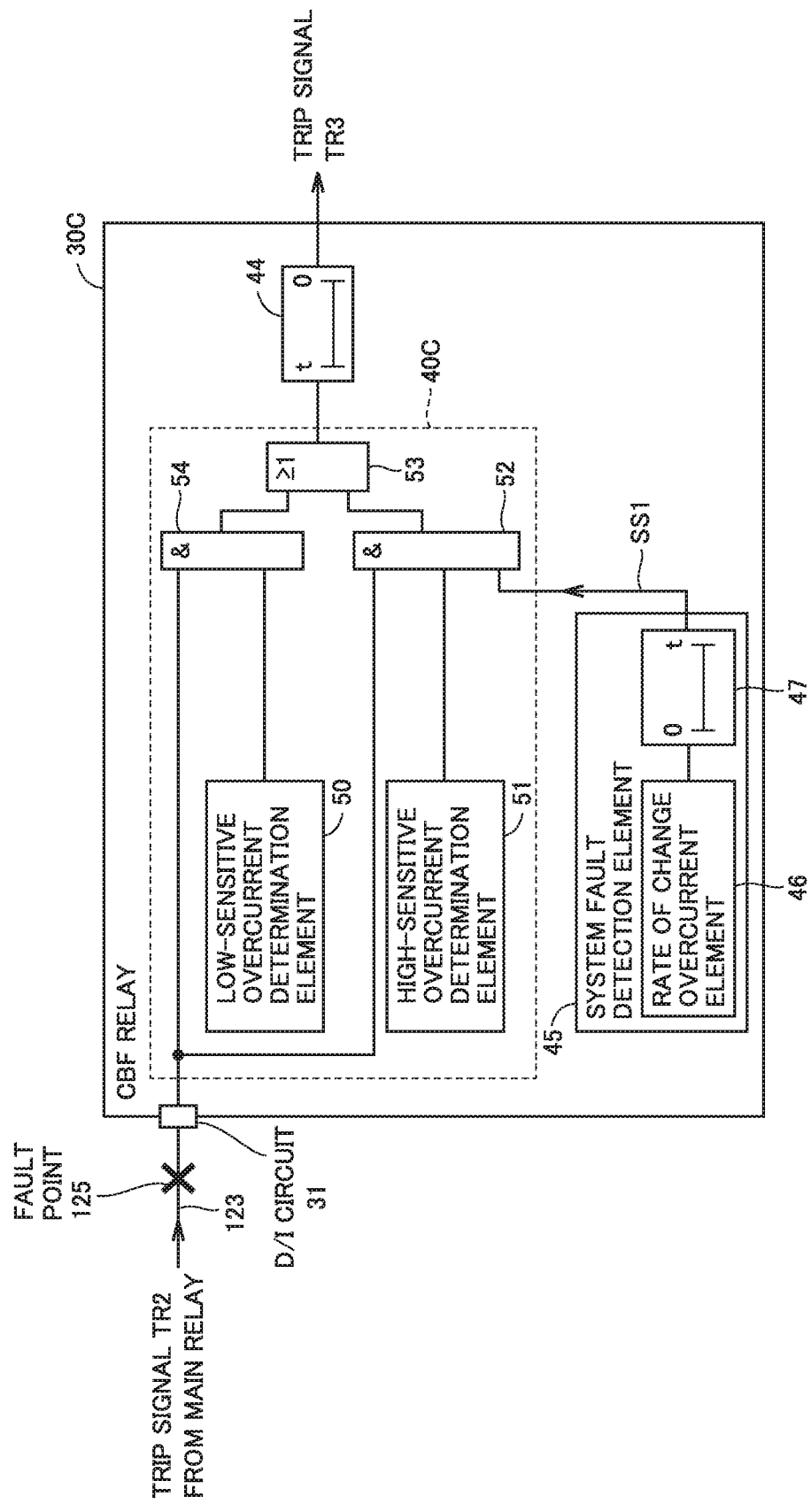
FIG. 7 is a block diagram showing the functional configuration of a CBF relay in a modification in FIG. 6.

FIG. 7 is a block diagram showing the functional configuration of the CBF relay in a modification in FIG. 6. A CBF detection element 40C in a CBF relay 30C in FIG. 7 is obtained by collectively integrating CBF detection element 40B and AND gate 43 in CBF relay 30B in FIG. 6. Furthermore, CBF relay 30C in FIG. 7 and CBF relay 30B in FIG. 6 are different in the order of logical operation. However, in both relays, the same logical operation is substantially carried out for the input signals.

Specifically, CBF detection element 40C in FIG. 7 includes a low-sensitive overcurrent determination element 50, a high-sensitive overcurrent determination element 51, an AND gate 52, an OR gate 53, and an AND gate 54. When the logic level of the output signal from high-sensitive overcurrent determination element 51 is "1", when the logic level of switching signal SS1 output from system fault detection element 45 is "1", and when the logic level of trip signal TR2 from main relay 20 is "1", then AND gate 52 outputs the signal of a logic level "1". When the logic level of the output signal from low-sensitive overcurrent determination element 50 is "1", and when the logic level of trip signal TR2 from main relay 20 is "1", then AND gate 54 outputs the signal of a logic level "1". When the logic level of the output signal from AND gate 52 is "1", or when the logic level of the output signal from AND gate 54 is "1", then OR gate 53 outputs trip signal TR3 through on-delay timer 44.

Accordingly, when a system fault is detected by system fault detection element 45, and when trip signal TR2 is input from main relay 20, CBF detection element 40C outputs the signal based on the determination result of high-sensitive overcurrent determination element 51 as trip signal TR3. On the other hand, when no system fault is detected by system fault detection element 45, and when trip signal TR2 is input from main relay 20, CBF detection element 40C outputs the signal based on the determination result of low-sensitive overcurrent determination element 50 as trip signal TR3.

Third Embodiment

Figure 8:
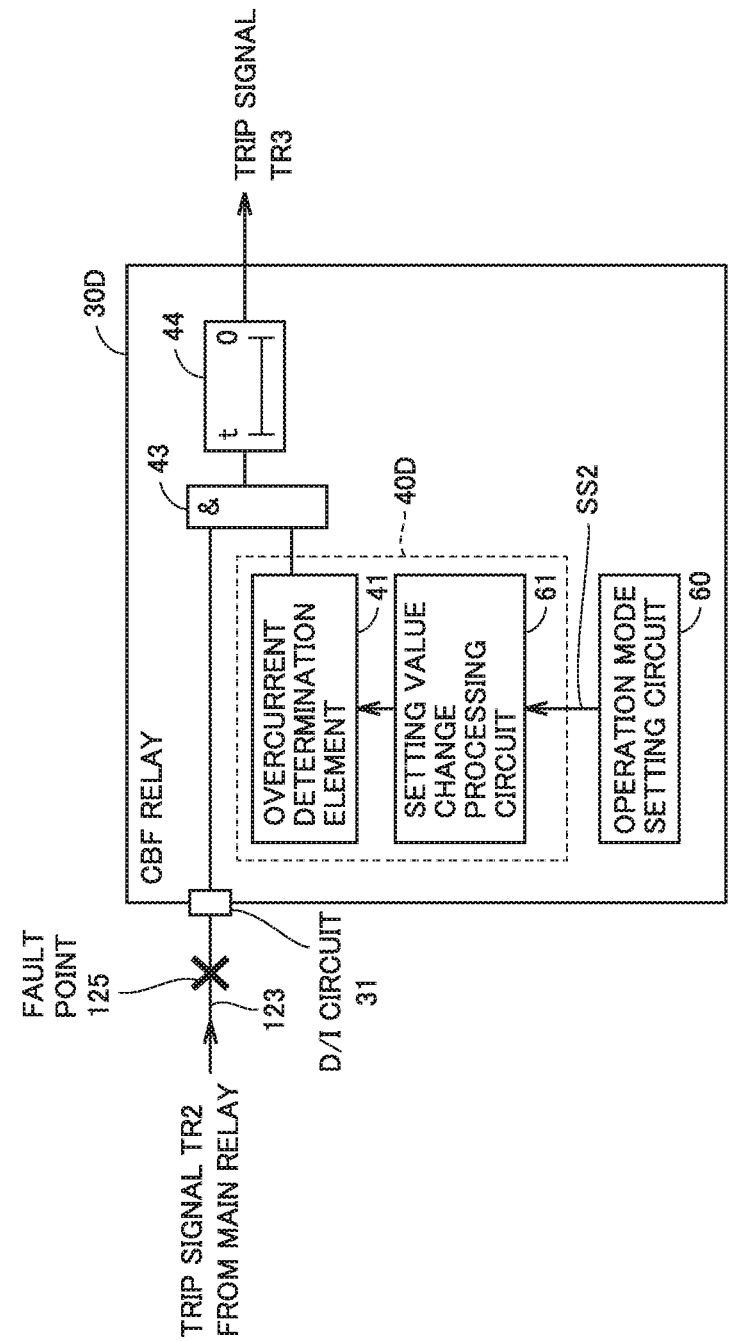
FIG. 8 is a block diagram showing the functional configuration of a CBF relay in the third embodiment.

FIG. 8 is a block diagram showing the functional configuration of a CBF relay in the third embodiment. CBF relay 30D in FIG. 8 is different from CBF relay 30A in FIG. 4 in that an operation mode setting circuit 60 is provided in place of system fault detection element 45. CBF detection element 40D in FIG. 8 is almost identical in configuration to CBF detection element 40A in FIG. 4, and includes an overcurrent determination element 41 and a setting value change processing circuit 61. Since other configurations of CBF relay 30D in FIG. 8 are similar to those of CBF relay 30A in FIG. 4, the same or corresponding components are designated by the same reference characters, and description thereof will not be repeated.

The CBF relay operates in operation modes including a "test mode" and a "normal operation mode". Operation mode setting circuit 60 serves as a circuit for setting this operation mode, and stores the set operation mode. Operation mode setting circuit 60 brings a switching signal SS2 output to setting value change processing circuit 61 into an active state ("1") in the "normal operation mode", and brings switching signal SS2 into an inactive state ("0") in the "test mode".

Overcurrent determination element 41 determines whether current detection signal CS from current transformer 7 in FIG. 1 exceeds the setting value or not. Then, when current detection signal CS exceeds the setting value, overcurrent determination element 41 outputs the signal of a logic level "1" showing an overcurrent.

When switching signal SS2 from operation mode setting circuit 60 is in the active state ("1"), setting value change processing circuit 61 sets the setting value of overcurrent determination element 41 at a value (a high-sensitive setting value) that allows detection of the fault current lower than the load current (the conceivable lowest fault current). When switching signal SS2 is in the inactive state ("0"), setting value change processing circuit 61 sets the setting value of overcurrent determination element 41 at a value (a low-sensitive setting value) that allows detection of only the fault current higher than the load current. The low-sensitive setting value is larger than the high-sensitive setting value. In the following, the operation of setting value change processing circuit 61 will be more specifically described with reference to the flowchart in FIG. 9.

Figure 9:
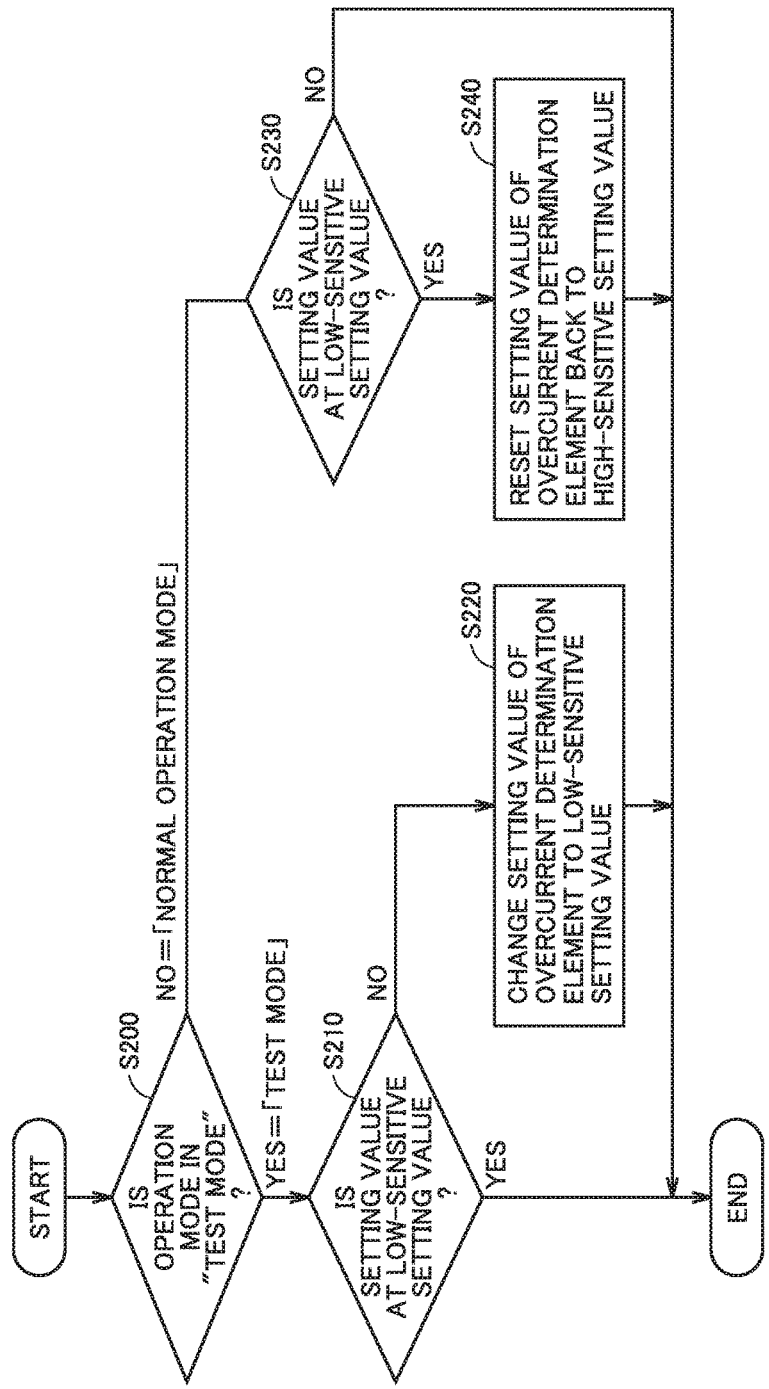
FIG. 9 is a flowchart illustrating the setting value changing procedure by a setting value change processing circuit in FIG. 8.

FIG. 9 is a flowchart illustrating the setting value changing procedure by the setting value change processing circuit in FIG. 8. Referring to FIGS. 8 and 9, when CBF relay 30D operates in the "test mode" (the logic level of switching signal SS2 is "0") (YES in step S200), and when the setting value of overcurrent determination element 41 is not the low-sensitive setting value (NO in step S210), setting value change processing circuit 61 changes the setting value of overcurrent determination element 41 to a low-sensitive setting value (step S220).

On the other hand, when CBF relay 30D operates in the "normal operation mode" (the logic level of switching signal SS2 is "1") (NO in step S200), and when the setting value of overcurrent determination element 41 is the low-sensitive setting value (YES in step S230), setting value change processing circuit 61 changes the setting value of overcurrent determination element 41 to a high-sensitive setting value (step S240).

According to CBF relay 30D in the above-described third embodiment, the setting value of overcurrent determination element 41 in CBF detection element 40D can be dynamically switched in accordance with the operation mode. Thus, during the inspection of protection relay system 10, by switching the operation mode of CBF relay 30D into the "test mode" in advance, malfunctioning of CBF relay 30D can be prevented even when trip signal TR2 is erroneously input into CBF relay 30D.

Fourth Embodiment

Figure 10:
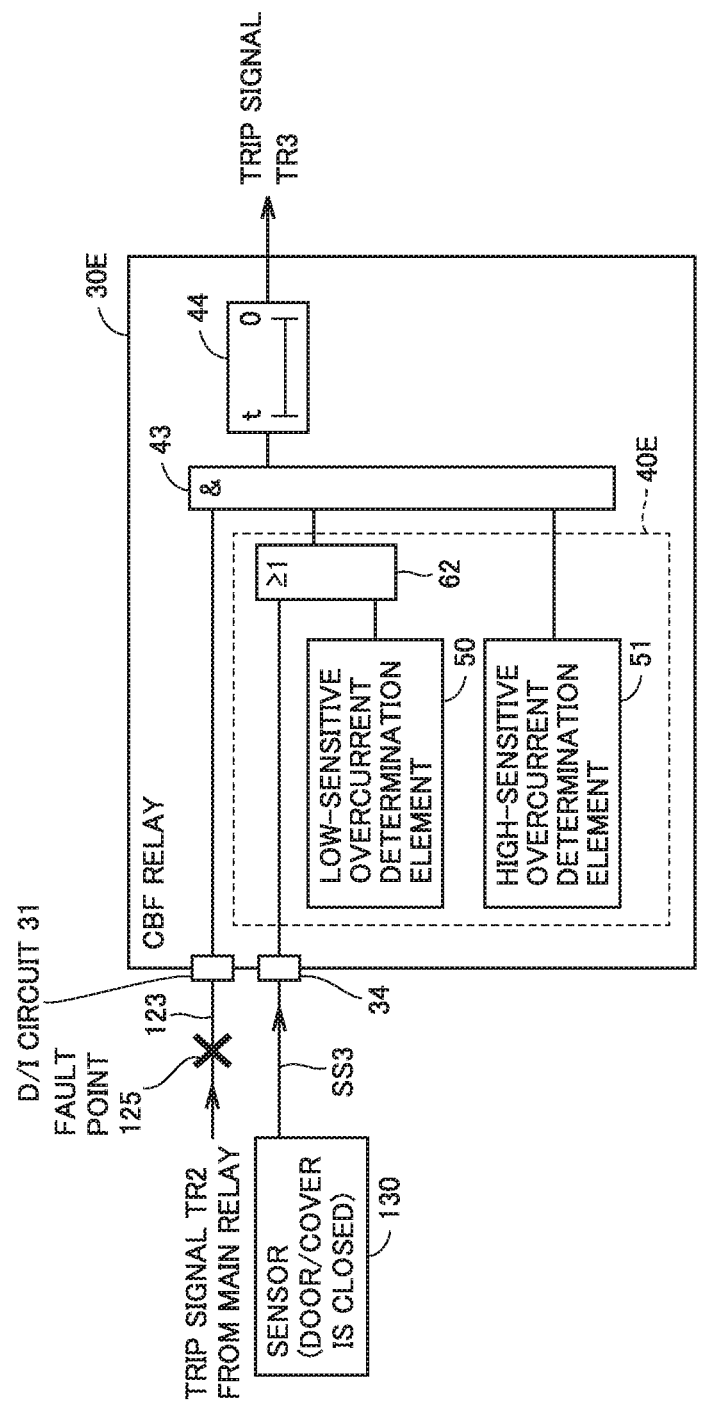
FIG. 10 is a block diagram showing the functional configuration of a CBF relay in the fourth embodiment.

FIG. 10 is a block diagram showing the functional configuration of a CBF relay in the fourth embodiment. A CBF relay 30E in FIG. 10 is characterized in that the setting value of CBF detection element 40E is switched between the high-sensitive setting value and the low-sensitive setting value based on the output signal from a sensor 130 provided outside.

Sensor 130 serves, for example, as a limit switch, a proximity sensor or the like for sensing opening and closing of the back door of the cabinet in which main relay 20 and CBF relay 30E are housed. Alternatively, sensor 130 serves as a limit switch, a proximity sensor or the like for sensing whether the cover for covering a terminal block inside the cabinet has been removed or not. Alternatively, sensor 130 may serve as a sensor: located inside the cabinet on the back surface side (in the vicinity of the terminal block) in which the CBF relay is housed; and configured to detect that a human body such as a human hand approaches. When sensor 130 detects that the back door of the cabinet and the cover of the terminal block are closed (more generally, when no abnormal state is detected, that is, in the normal operation state), the logic level of the output signal (switching signal SS3) from sensor 130 is to be "1" (active state). In contrast, when sensor 130 detects that the back door of the cabinet and the cover of the terminal block are opened (more generally, when an abnormal state is detected, that is, during an inspection or the like but not in the normal operation state), the logic level of the output signal (switching signal SS3) from sensor 130 is to be "0" (inactive state).

CBF relay 30E includes: a D/I circuit 31 configured to receive trip signal TR2 from main relay 20; a D/I circuit 34 configured to receive the output signal (switching signal SS3) from sensor 130; a CBF detection element 40E; an AND gate 43; and an on-delay timer 44. Furthermore, CBF detection element 40E includes low-sensitive overcurrent determination element 50 and high-sensitive overcurrent determination element 51 that have been described in FIG. 6, and an OR gate 62.

When the logic level of the output signal (switching signal SS3) from sensor 130 is "1", or when the logic level of the output signal from low-sensitive overcurrent determination element 50 is "1", OR gate 62 outputs the output signal of a logic level "1". When the logic level of trip signal TR2 from main relay 20 is "1", when the logic level of the output signal from OR gate 62 is "1", and when the logic level of the output signal from high-sensitive overcurrent determination element 51 is "1", AND gate 43 outputs trip signal TR3 through on-delay timer 44 to neighboring circuit breakers 5 and 6.

Accordingly, in CBF relay 30E in FIG. 10, when the logic level of the output signal (switching signal SS3) from sensor 130 is "1" (active state), irrespective of the output signal from low-sensitive overcurrent determination element 51, it is determined based on the output signal from high-sensitive overcurrent determination element 51 whether trip signal TR3 is output or not. On the other hand, when the logic level of the output signal (switching signal SS3) from sensor 130 is "0" (inactive state), it is determined based on the output signal from low-sensitive overcurrent determination element 50 whether trip signal TR3 is output or not. In the latter case, when the logic level of the output signal from low-sensitive overcurrent determination element 50 is "1", the logic level of the output signal from high-sensitive overcurrent determination element 51 is "1" without fail. Thus, the determination result of high-sensitive overcurrent determination element 51 does not influence the output of trip signal TR3.

As described above, according to CBF relay 30E in the fourth embodiment, based on the output signal from sensor 130 for determining whether protection relay system 10 is under inspection or not, the setting value of CBF detection element 40E is dynamically changed. Accordingly, even when the trip signal is erroneously input into CBF relay 30E during the inspection of protection relay system 10, malfunctioning of CBF relay 30E can be prevented.

Fifth Embodiment

Figure 11:
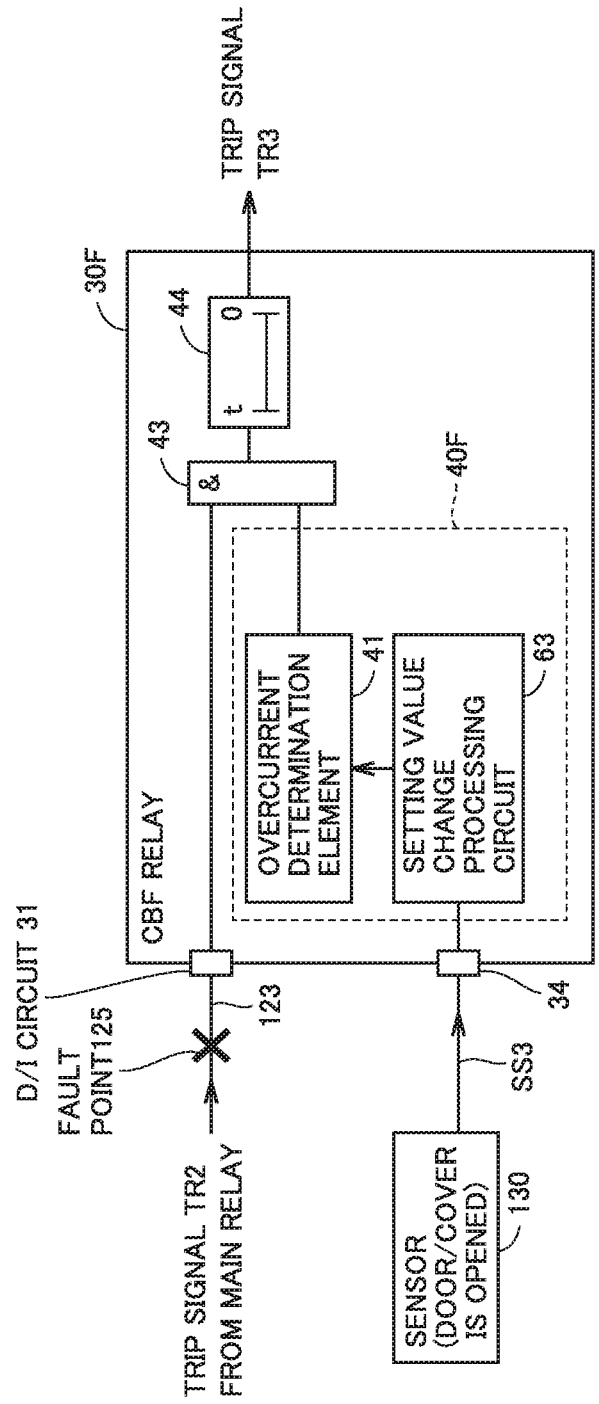
FIG. 11 is a block diagram showing the functional configuration of a CBF relay in the fifth embodiment.

FIG. 11 is a block diagram showing the functional configuration of a CBF relay in the fifth embodiment. A CBF relay 30F in FIG. 11 includes a CBF detection element 40F that is different in configuration from CBF detection element 40E in FIG. 10. Since other configurations of CBF relay 30F in FIG. 11 are similar to those of CBF relay 30E in FIG. 10, the same or corresponding components are designated by the same reference characters, and description thereof will not be repeated.

CBF detection element 40F in FIG. 11 is almost identical in configuration to CBF detection element 40A in FIG. 4 and CBF detection element 40D in FIG. 8, and includes an overcurrent determination element 41 and a setting value change processing circuit 63.

Overcurrent determination element 41 determines whether current detection signal CS from current transformer 7 in FIG. 1 exceeds the setting value or not. When current detection signal CS exceeds the setting value, overcurrent determination element 41 outputs the signal of a logic level "1" showing an overcurrent. Furthermore, when the logic level of the output signal from overcurrent determination element 41 is "1", and when the logic level of trip signal TR2 from main relay 20 is "1", AND gate 43 in CBF relay 30F outputs trip signal TR3 to neighboring circuit breakers 5 and 6 through on-delay timer 44.

When the output signal (switching signal SS3) from sensor 130 is in the active state ("1"), setting value change processing circuit 63 sets the setting value of overcurrent determination element 41 at a value (high-sensitive setting value) that allows detection of the fault current smaller in magnitude than the load current (the fault current of the conceivable smallest magnitude). When the output signal (switching signal SS3) from sensor 130 is in the inactive state ("0"), setting value change processing circuit 63 sets the setting value of overcurrent determination element 41 at a value (low-sensitive setting value) that allows detection of only the fault current larger than the load current. In the following, the operation of setting value change processing circuit 63 will be more specifically described with reference to the flowchart in FIG. 12.

Figure 12:
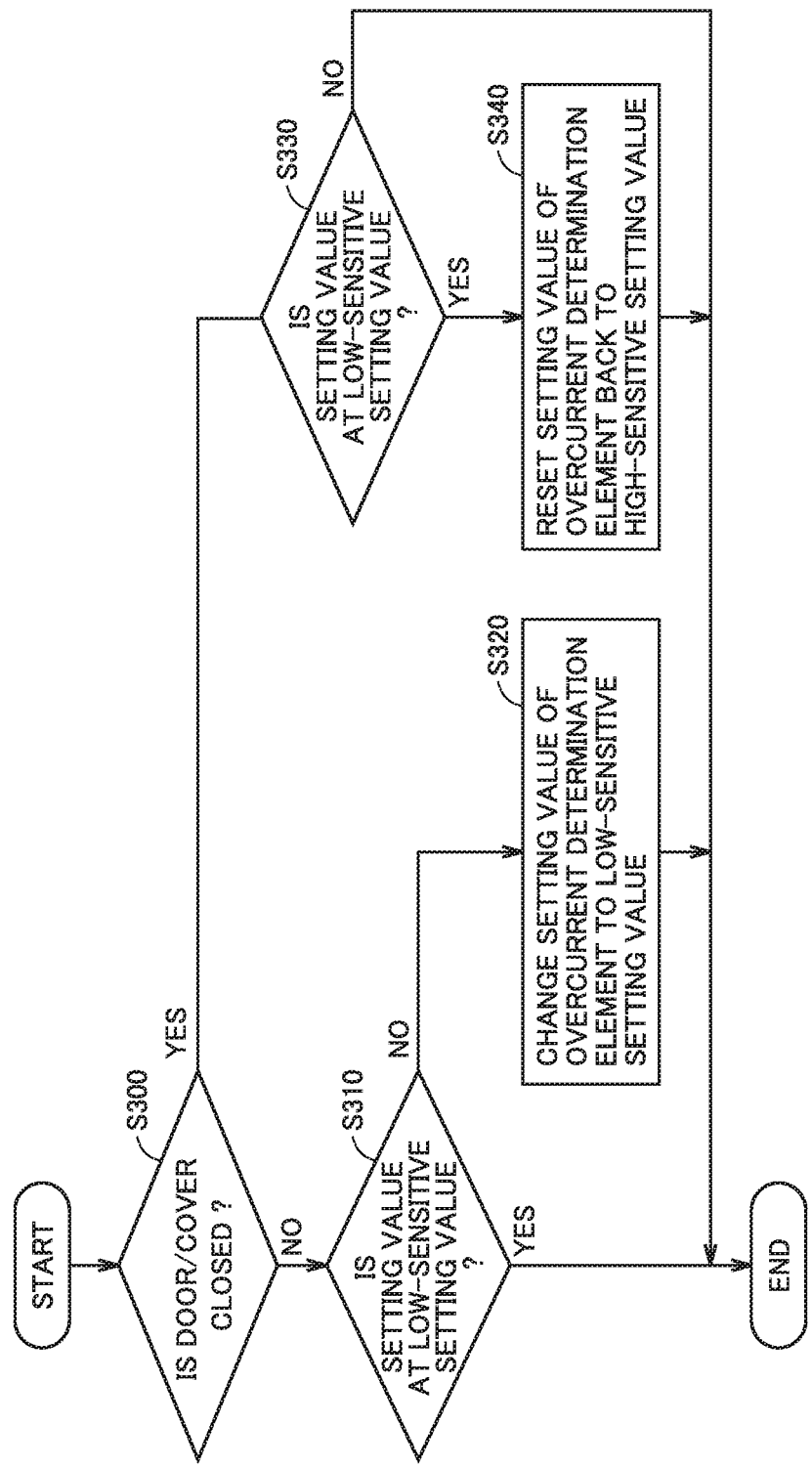
FIG. 12 is a flowchart illustrating the setting value changing procedure by a setting value change processing circuit in FIG. 11.

FIG. 12 is a flowchart illustrating the setting value changing procedure by the setting value change processing circuit in FIG. 11. In the example in FIG. 12, sensor 130 in FIG. 11 serves as a limit switch or a proximity sensor for sensing opening and closing of the back door of the cabinet in which protection relay system 10 is housed, or for sensing opening and closing of the cover of the terminal block inside the cabinet.

Referring to FIGS. 11 and 12, when the back door or the terminal block cover is opened (the logic level of switching signal SS3 is "0") (NO in step S300), and when the setting value of overcurrent determination element 41 is not the low-sensitive setting value (NO in step S310), setting value change processing circuit 63 changes the setting value of overcurrent determination element 41 to a low-sensitive setting value (step S320).

On the other hand, when the back door or the terminal block cover is closed (the logic level of switching signal SS3 is "1") (YES in step S300), and when the setting value of overcurrent determination element 41 is a low-sensitive setting value (YES in step S330), setting value change processing circuit 63 changes the setting value of overcurrent determination element 41 to a high-sensitive setting value (step S340).

According to CBF relay 30F in the above-described fifth embodiment, based on the output signal from sensor 130 for sensing whether protection relay system 10 is under inspection not, the setting value of overcurrent determination element 41 in CBF detection element 40F can be dynamically switched. Accordingly, even when trip signal TR2 is erroneously input into CBF relay 30F during the inspection of protection relay system 10, malfunctioning of CBF relay 30F can be prevented.

Sixth Embodiment

CBF detection elements 40A to 40F in the above-described first to fifth embodiments can be optionally combined. By combining the CBF detection elements as different means, malfunctioning of the CBF relay can be more reliably prevented. In the sixth embodiment, CBF detection element 40E in FIG. 10 is combined with CBF detection element 40D and operation mode setting circuit 60 in FIG. 8, which will be hereinafter specifically described with reference to FIG. 13.

Figure 13:
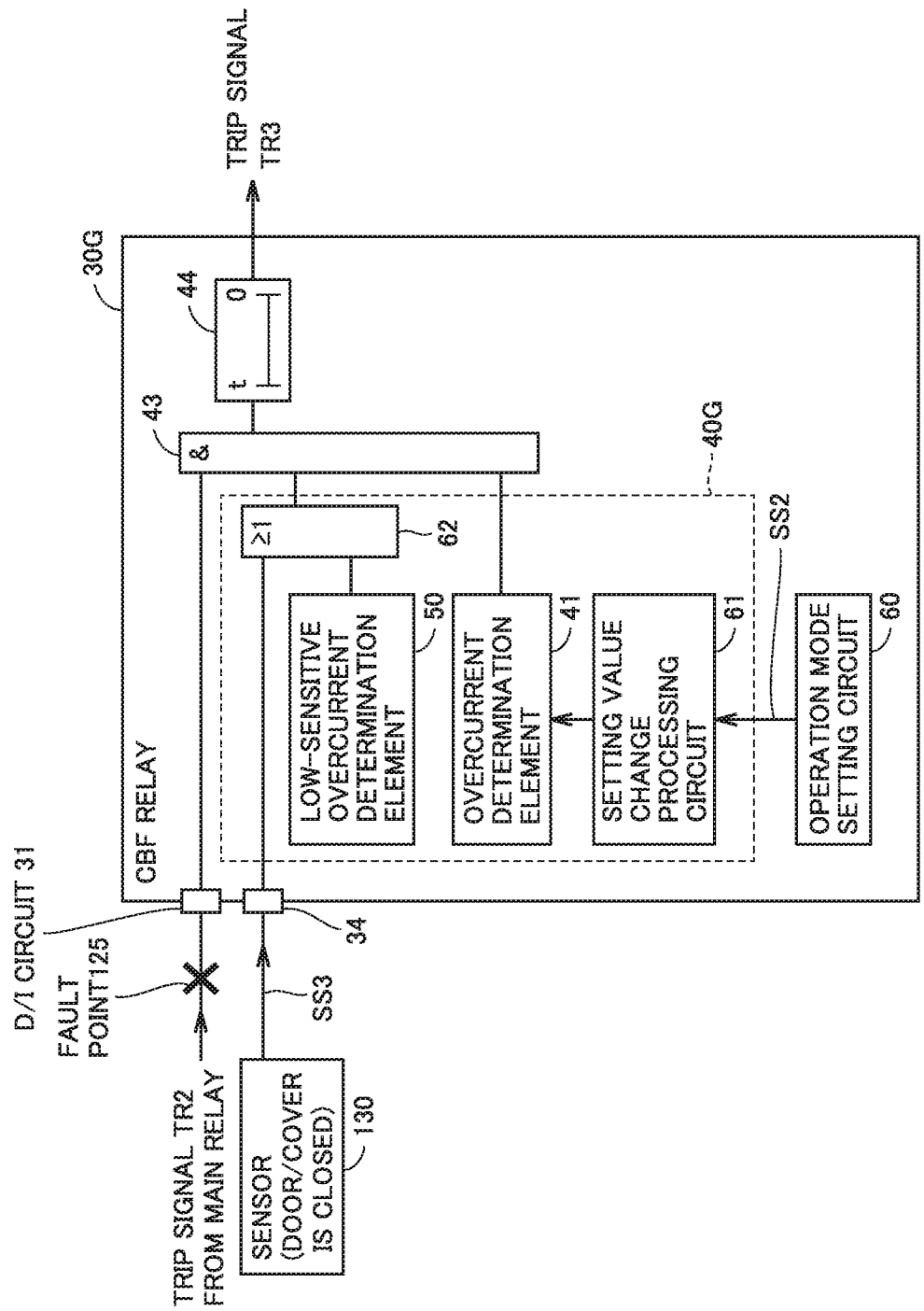
FIG. 13 is a block diagram showing the functional configuration of a CBF relay in the sixth embodiment.

FIG. 13 is a block diagram showing the functional configuration of a CBF relay in the sixth embodiment. CBF detection element 40G in FIG. 13 is different from CBF detection element 40E in FIG. 10 in that it includes overcurrent determination element 41 and setting value change processing circuit 61 in FIG. 8 in place of high-sensitive overcurrent determination element 51 in FIG. 10. Furthermore, CBF relay 30G in FIG. 13 includes operation mode setting circuit 60 in FIG. 8.

As described with reference to FIGS. 8 and 9, when CBF relay 30G operates in the "test mode" (the logic level of switching signal SS2 is "0"), setting value change processing circuit 61 sets the setting value of overcurrent determination element 41 at a low-sensitive setting value. On the other hand, when CBF relay 30G operates in the "normal operation mode" (the logic level of switching signal SS2 is "1"), setting value change processing circuit 61 sets the setting value of overcurrent determination element 41 at a high-sensitive setting value. Thus, the setting value of CBF detection element 40G can be switched in accordance with the operation mode of CBF relay 30G.

Furthermore, as described in FIG. 10, when the logic level of the output signal (switching signal SS3) from sensor 130 is "1" (active state), irrespective of the output signal from low-sensitive overcurrent determination element 50, it is determined based on the output signal from overcurrent determination element 41 whether trip signal TR3 is output or not. On the other hand, when the logic level of the output signal (switching signal SS3) from sensor 130 is "0" (inactive state), it is determined based on the output signal from low-sensitive overcurrent determination element 50 whether trip signal TR3 is output or not. Thus, according to CBF relay 30G in FIG. 13, the setting value of CBF detection element 40G can be switched also based on the output signal from the sensor (for example, opened/closed state of the back door of the cabinet).

In the above-described embodiments, even when the operation mode of CBF relay 30G is set in the "test mode", but after a lapse of a prescribed time period, operation mode setting circuit 60 may automatically brings the operation mode back into the "normal operation mode". Thereby, it becomes possible to prevent forgetting to bring the operation mode back into the "normal operation mode" after completion of the inspection. Also, even when the operation mode goes back to the "normal operation mode" during the inspection, based on the output signal (switching signal SS3) from sensor 130, the output signal from low-sensitive overcurrent determination element 50 is prioritized over the output signal from overcurrent determination element 41. Accordingly, malfunctioning of CBF relay 30G can be prevented.

Seventh Embodiment

Unlike the first to sixth embodiments, CBF relay 30H in the seventh embodiment cannot dynamically change the setting value of overcurrent determination element 41. As in the first to sixth embodiments, however, CBF relay 30H reliably detects a circuit breaker failure, and also does not malfunction even when it erroneously detects trip signal TR2 from main relay 20, which will be hereinafter specifically described with reference to the figures.

Figure 14:
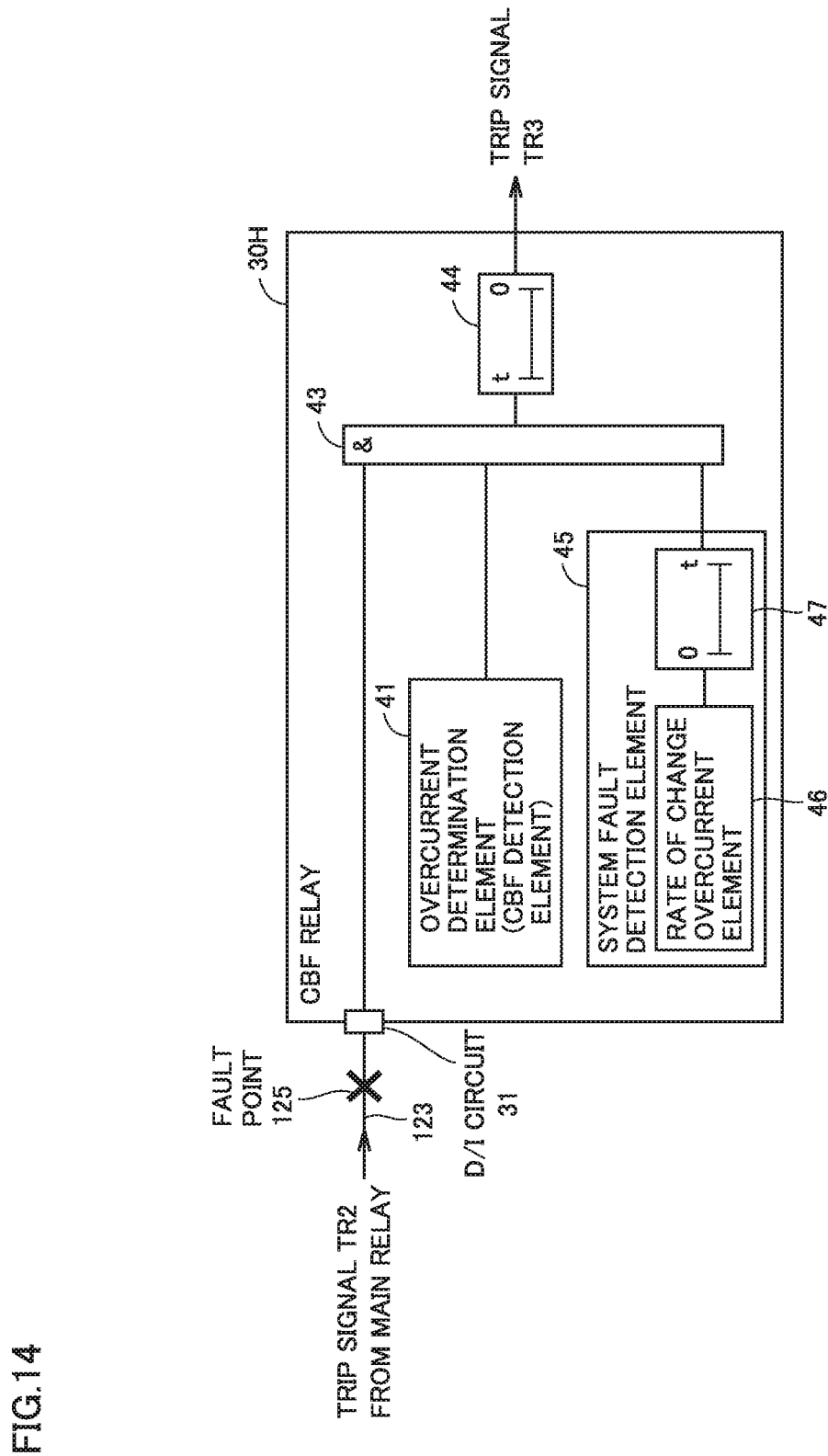
FIG. 14 is a block diagram showing the functional configuration of a CBF relay in the seventh embodiment.

FIG. 14 is a block diagram showing the functional configuration of a CBF relay in the seventh embodiment. Referring to FIG. 14, CBF relay 30H includes: a D/I circuit 31 configured to receive trip signal TR2 from the main relay; an overcurrent determination element 41 serving as a CBF detection element; a system fault detection element 45; an AND gate 43; and an on-delay timer 44.

Overcurrent determination element 41 compares the setting value and the magnitude of current detection signal CS from current transformer 7 in FIG. 1, and then, detects a failure of circuit breaker 4 based on the comparison result. In this case, the setting value of overcurrent determination element 41 is set at a value (high-sensitive setting value) that allows detection of the fault current of the conceivable smallest magnitude (smaller than the magnitude of the load current at the time when the power system is in the normal state).

System fault detection element 45 detects a power system fault by the means different from those of overcurrent determination element 41. Accordingly, system fault detection element 45 does not detect a load current in the normal state. Specifically, as described in FIG. 4, system fault detection element 45 includes a rate of change overcurrent element 46 and an off-delay timer 47. Also, a voltage variation width relay or an undervoltage relay can also be used in place of rate of change overcurrent element 46.

When trip signal TR2 from the main relay is "1", when the logic level of the output signal from overcurrent determination element 41 is "1", and when the system fault is detected by system fault detection element 45, AND gate 43 outputs trip signal TR3 to neighboring circuit breakers 5 and 6 through on-delay timer 44.

Thus, according to the above-described CBF relay 30H, a circuit breaker failure can be reliably detected by setting the setting value of overcurrent determination element 41 to a high-sensitive value. Furthermore, trip signal TR3 is not output from CBF relay 30H to neighboring circuit breakers 5 and 6 unless a system fault is detected by system fault detection element 45. Accordingly, even when trip signal TR2 from main relay 20 is erroneously detected, CBF relay 30H does not malfunction.

Eighth Embodiment

In the eighth embodiment, a protection relay system to which the CBF relay in each of the above-described first to seventh embodiments is applicable is provided. A protection relay system 10 in the eighth embodiment serves to prevent malfunctioning of CBF relay 30 by duplication of trip signals TR2 and TR5 output from main relay 20, which will be hereinafter specifically described with reference to the figures.

Figure 15:
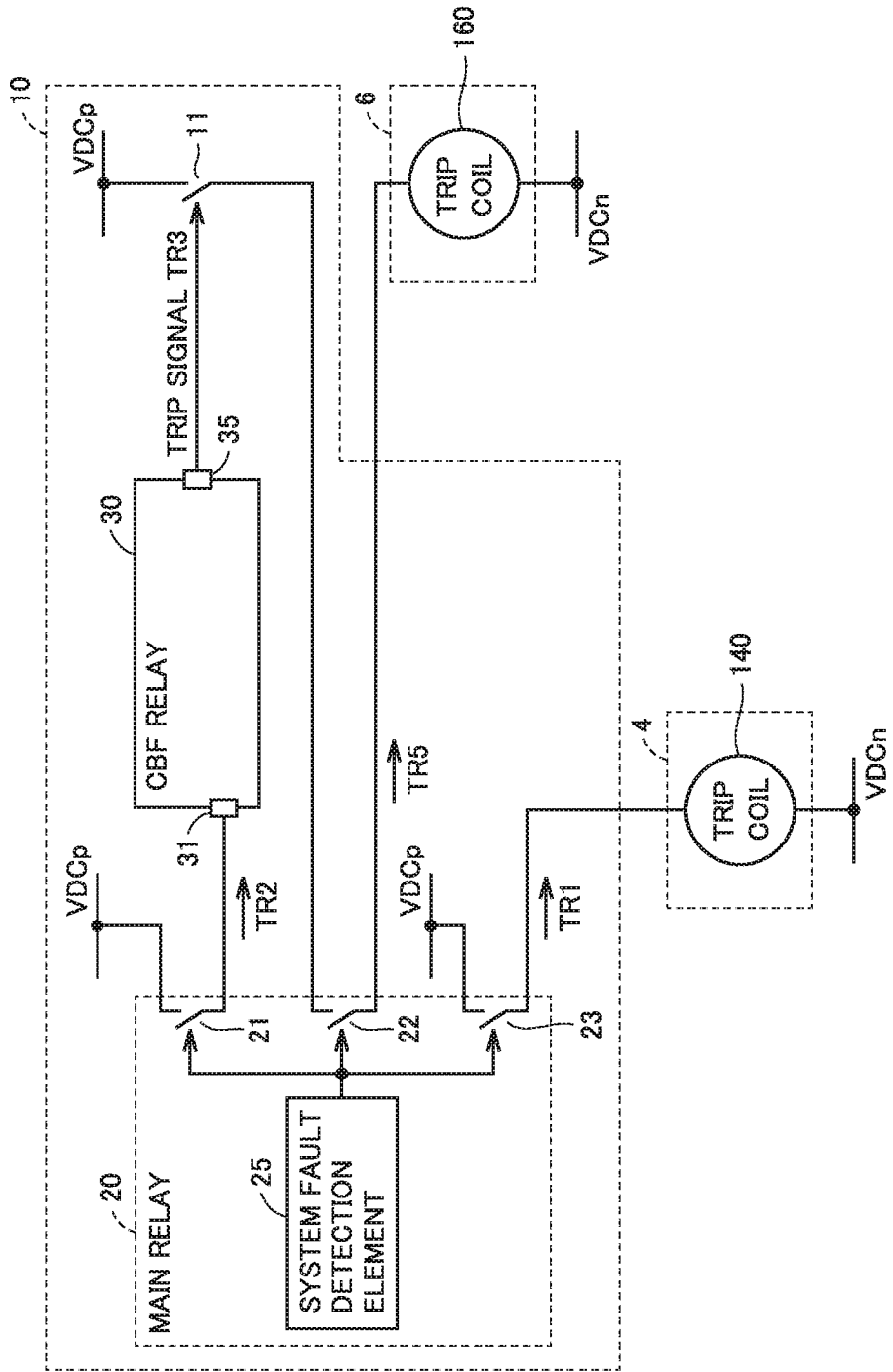
FIG. 15 is a block diagram showing the configuration of a protection relay system in the eighth embodiment.

FIG. 15 is a block diagram showing the configuration of a protection relay system in the eighth embodiment. Referring to FIGS. 1 and 15, protection relay system 10 includes a main relay 20, a CBF relay 30, and a switch 11 that is brought into an ON state (closed state) by trip signal TR3 output from D/O circuit 35 in CBF relay 30. As CBF relay 30, each of CBF relays 30A to 30H in the first to seventh embodiments is also applicable. Furthermore, CBF relay 30 can be applicable also when system fault detection element 45 is not provided in CBF relay 30H in FIG. 14.

Main relay 20 includes: a system fault detection element 25 formed of a current differential relay or a distance relay; and D/O circuits 23, 21, and 22 that are independent from each other and configured to output trip signals TR1, TR2, and TR5, respectively, when system fault detection element 25 detects a system fault.

When the switch of D/O circuit 23 in main relay 20 is turned on, trip signal TR1 flows from a high potential VDCp in a DC power supply in the direction of a low potential VDCn. This causes a current to flow through a trip coil 140 in circuit breaker 4. Also, when the switch of D/O circuit 21 in main relay 20 is turned on, trip signal TR2 is input into D/I circuit 31 in CBF relay 30.

The switch of D/O circuit 22 in main relay 20 is connected in series to switch 11. Accordingly, when trip signal TR3 is output from CBF relay 30 upon detection of the failure of circuit breaker 4, a trip signal TR5 flows through a trip coil 160 in neighboring circuit breaker 6 through switch 11 and D/O circuit 22 in main relay 20. As a result, circuit breaker 6 is opened. Thus, circuit breaker 6 is opened at the time when trip signal TR5 is output from main relay 20, and when trip signal TR3 is output from CBF relay 30.

According to the above-described configuration, also when CBF relay 30 erroneously detects trip signal TR2 from main relay 20, trip signal TR5 is not output from D/O circuit 22 in main relay 20, with the result that neighboring circuit breaker 6 is not erroneously broken.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 electric line, 4, 5, 6 circuit breaker, 7 current transformer, 10 protection relay system, 11 switch, 20 main relay, 25, 45 system fault detection element, 30, 30A to 30H failure protection relay device (CBF relay), 40A to 40G CBF detection element, 41 overcurrent determination element, 42, 61, 63 setting value change processing circuit, 44 on-delay timer, 46 rate of change overcurrent element, 47 off-delay timer, 50 low-sensitive overcurrent determination element, 51 high-sensitive overcurrent determination element, 60 operation mode setting circuit, 130 sensor, 140, 160 trip coil, CS current detection signal, SS1, SS2, SS3 switching signal, TR1 to TR5 trip signal.

The invention claimed is:

1. A circuit breaker failure protection relay comprising:
an input circuit to which a first opening command for a first circuit breaker is input; and
a circuit breaker failure detection element configured to compare a magnitude of a current detected in a power system with a setting value to make a determination as to whether an overcurrent occurs due to a failure of the first circuit breaker,
the circuit breaker failure detection element being capable of changing the setting value to a first value and a second value that is larger than the first value according to a switching signal,
the first value being smaller than a magnitude of a load current of the power system and the second value being larger than the magnitude of the load current,
the circuit breaker failure protection relay being configured to, when the first opening command is input and when the circuit breaker failure detection element determines that the overcurrent occurs, output a second opening command for a second circuit breaker in a neighborhood of the first circuit breaker,
wherein:
the circuit breaker failure protection relay further includes a power system fault detection element configured to detect a fault in the power system by a method other than the determination about the overcurrent, and
the power system fault detection element is configured to, upon detection of the fault, output the switching signal activated for setting the setting value at the first value.

2. The circuit breaker failure protection relay according to claim 1, wherein the power system fault detection element includes one of a rate of change overcurrent element, a voltage variation width relay element and an undervoltage relay element.

3. The circuit breaker failure protection relay according to claim 1, wherein
the switching signal is an output signal from a sensor disposed outside the circuit breaker failure protection relay, and
the sensor is configured to output the switching signal activated for setting the setting value at the first value when an abnormal state is not detected.

4. The circuit breaker failure protection relay according to claim 1, wherein
the circuit breaker failure protection relay is configured to operate in one of a test mode and a normal operation mode as an operation mode, and further includes an operation mode setting circuit for setting the operation mode, and
the operation mode setting circuit is configured to:
output the switching signal in an inactive state for setting the setting value at the second value when the operation mode is the test mode; and
output the switching signal activated for setting the setting value at the first value when the operation mode is the normal operation mode.

5. The circuit breaker failure protection relay according to claim 1, wherein
the circuit breaker failure detection element includes:
an overcurrent detection element configured to compare the magnitude of the current detected in the power system with the setting value to make the determination about the overcurrent; and
a setting value change processing circuit configured to change the setting value of the overcurrent detection element, and
the setting value change processing circuit is configured to:
set the setting value at the first value when the switching signal is activated; and
set the setting value at the second value when the switching signal is inactivated.

6. The circuit breaker failure protection relay according to claim 1, wherein
the circuit breaker failure detection element includes:
a first overcurrent detection element for which the setting value is set at the first value; and
a second overcurrent detection element for which the setting value is set at the second value, and
the circuit breaker failure protection relay is configured to:
output a determination result of the first overcurrent detection element when the switching signal is activated; and
output a determination result of the second overcurrent detection element when the switching signal is inactivated.

7. A protection relay system comprising:
a protection relay configured to, upon detection of a fault in a power system, output a first opening command for opening a first circuit breaker, and a second opening command for opening a second circuit breaker in a neighborhood of the first circuit breaker; and
a circuit breaker failure protection relay,
the circuit breaker failure protection relay including:
an input circuit to which the first opening command is input; and
a circuit breaker failure detection element configured to compare a magnitude of a current detected in the power system with a setting value to make a determination as to whether an overcurrent occurs due to a failure of the first circuit breaker,
the circuit breaker failure detection element being capable of changing the setting value to a first value and a second value that is larger than the first value according to a switching signal,
the first value being smaller than a magnitude of a load current of the power system and the second value being larger than the magnitude of the load current, the circuit breaker failure protection relay being configured to, when the first opening command is input, and when the circuit breaker failure detection element determines that the overcurrent occurs, output a third opening command for opening the second circuit breaker, the second circuit breaker being configured to be opened when the second circuit breaker receives both the second opening command and the third opening command, wherein:

the circuit breaker failure protection relay further includes a power system fault detection element configured to detect a fault in the power system by a method other than the determination about the overcurrent, and the power system fault detection element is configured to, upon detection of the fault, output the switching signal activated for setting the setting value at the first value.

8. The circuit breaker failure protection relay according to claim 2, wherein the circuit breaker failure detection element includes:
an overcurrent detection element configured to compare the magnitude of the current detected in the power system with the setting value to make the determination about the overcurrent; and
a setting value change processing circuit configured to change the setting value of the overcurrent detection element, and the setting value change processing circuit is configured to:
set the setting value at the first value when the switching signal is activated; and
set the setting value at the second value when the switching signal is inactivated.

9. The circuit breaker failure protection relay according to claim 3, wherein the circuit breaker failure detection element includes:
an overcurrent detection element configured to compare the magnitude of the current detected in the power system with the setting value to make the determination about the overcurrent; and
a setting value change processing circuit configured to change the setting value of the overcurrent detection element, and the setting value change processing circuit is configured to:
set the setting value at the first value when the switching signal is activated; and
set the setting value at the second value when the switching signal is inactivated.

10. The circuit breaker failure protection relay according to claim 4, wherein the circuit breaker failure detection element includes:
an overcurrent detection element configured to compare the magnitude of the current detected in the power system with the setting value to make the determination about the overcurrent; and
a setting value change processing circuit configured to change the setting value of the overcurrent detection element, and the setting value change processing circuit is configured to:
set the setting value at the first value when the switching signal is activated; and
set the setting value at the second value when the switching signal is inactivated.

11. The circuit breaker failure protection relay according to claim 2, wherein the circuit breaker failure detection element includes:
a first overcurrent detection element for which the setting value is set at the first value; and
a second overcurrent detection element for which the setting value is set at the second value, and the circuit breaker failure protection relay is configured to:
output a determination result of the first overcurrent detection element when the switching signal is activated; and
output a determination result of the second overcurrent detection element when the switching signal is inactivated.

12. The circuit breaker failure protection relay according to claim 3, wherein the circuit breaker failure detection element includes:
a first overcurrent detection element for which the setting value is set at the first value; and
a second overcurrent detection element for which the setting value is set at the second value, and the circuit breaker failure protection relay is configured to:
output a determination result of the first overcurrent detection element when the switching signal is activated; and
output a determination result of the second overcurrent detection element when the switching signal is inactivated.

13. The circuit breaker failure protection relay according to claim 4, wherein the circuit breaker failure detection element includes:
a first overcurrent detection element for which the setting value is set at the first value; and
a second overcurrent detection element for which the setting value is set at the second value, and the circuit breaker failure protection relay is configured to:
output a determination result of the first overcurrent detection element when the switching signal is activated; and
output a determination result of the second overcurrent detection element when the switching signal is inactivated.

14. A circuit breaker failure protection relay comprising:
an input circuit to which a first opening command for a first circuit breaker is input; and
a circuit breaker failure detection element configured to compare a magnitude of a current detected in a power system with a setting value to make a determination as to whether an overcurrent occurs due to a failure of the first circuit breaker, the circuit breaker failure detection element being capable of changing the setting value to a first value and a second value that is larger than the first value according to a switching signal, the first value being smaller than a magnitude of a load current of the power system and the second value being larger than the magnitude of the load current, the circuit breaker failure protection relay being configured to, when the first opening command is input and when the circuit breaker failure detection element determines that the overcurrent occurs, output a second opening command for a second circuit breaker in a neighborhood of the first circuit breaker, wherein:
the circuit breaker failure protection relay is configured to operate in one of a test mode and a normal operation mode as an operation mode, and further includes an operation mode setting circuit for setting the operation mode, and the operation mode setting circuit is configured to:
output the switching signal in an inactive state for setting the setting value at the second value when the operation mode is the test mode; and
output the switching signal activated for setting the setting value at the first value when the operation mode is the normal operation mode.

* * * * *